(12) United States Patent
Miyano et al.

(10) Patent No.: US 12,104,693 B2
(45) Date of Patent: Oct. 1, 2024

(54) SHIFT RANGE CONTROL DEVICE

(71) Applicant: DENSO CORPORATION, Kariya (JP)

(72) Inventors: Haruka Miyano, Kariya (JP); Koji Sakaguchi, Kariya (JP); Jun Yamada, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 17/385,177

(22) Filed: Jul. 26, 2021

(65) Prior Publication Data
US 2021/0356040 A1 Nov. 18, 2021

Related U.S. Application Data

(63) Continuation of application No. PCT/JP2020/001517, filed on Jan. 17, 2020.

(30) Foreign Application Priority Data

Jan. 28, 2019 (JP) ................. 2019-011927

(51) Int. Cl.
H02P 6/16 (2016.01)
F16H 61/02 (2006.01)
F16H 61/32 (2006.01)
H02P 3/18 (2006.01)
H02P 6/28 (2016.01)
H02P 9/18 (2006.01)
H02P 27/06 (2006.01)

(52) U.S. Cl.
CPC ......... *F16H 61/32* (2013.01); *F16H 61/0202* (2013.01); *H02P 3/18* (2013.01); *H02P 6/28* (2016.02); *F16H 2061/326* (2013.01); *H02P 27/06* (2013.01)

(58) Field of Classification Search
CPC .................... H02P 25/08; H02P 6/16
See application file for complete search history.

(56) References Cited

U.S. PATENT DOCUMENTS 6,311,559 B1    11/2001  Maruyama et al.
2003/0222617 A1 12/2003  Nakai et al.
2006/0033464 A1  2/2006  Nakai et al.
(Continued)

FOREIGN PATENT DOCUMENTS

JP  8-275571    10/1996
JP  2001-231278  8/2001

*Primary Examiner* — Kawing Chan
*Assistant Examiner* — Charles S Laughlin
(74) *Attorney, Agent, or Firm* — Nixon & Vanderhye P.C.

(57) ABSTRACT

A shift range control device switches a shift range by controlling a drive of a motor in which a rotor rotates by energizing a motor winding. An angle calculation unit calculates a motor angle based on a signal from a rotation angle sensor that detects a rotation position of the rotor. An energization control unit drives the rotor so that the motor angle becomes a target angle according to the target shift range, and stops the rotor at a position where the motor angle becomes the target angle, by controlling the energization of the motor winding. A zero point estimation unit estimates a speed 0 point, which is a timing at which a rotational speed of the vibrating rotor becomes 0 during the stop control for stopping the rotor. The energization control unit switches a current control at the estimated speed 0 point.

16 Claims, 16 Drawing Sheets

(56) References Cited

U.S. PATENT DOCUMENTS

| | | |
|---|---|---|
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0068730 A1* | 3/2011 | Nakai .................... H02P 25/08 318/563 |
| 2011/0175563 A1* | 7/2011 | Yamada .................. G05B 7/02 318/591 |
| 2019/0195357 A1 | 6/2019 | Kamio |

* cited by examiner

SHIFT RANGE CONTROL DEVICE

CROSS REFERENCE TO RELATED APPLICATION

This application is a continuation application of International Patent Application No. PCT/JP2020/001517 filed on Jan. 17, 2020, which designated the U.S. and based on and claims the benefits of priority of Japanese Patent Application No. 2019-011927 filed on Jan. 28, 2019. The entire disclosure of all of the above applications is incorporated herein by reference.

TECHNICAL FIELD

The present disclosure relates to a shift range control device.

BACKGROUND

Conventionally, a motor control device controls the drive of a motor that is a drive source of a range switching mechanism.

SUMMARY

An object of the present disclosure is to provide a shift range control device capable of stopping a motor with high accuracy.

A shift range control device according to the present disclosure switches a shift range by controlling a drive of a motor in which a rotor rotates by energizing a motor winding, and includes an angle calculation unit, an energization control unit, and a zero point estimation unit.

The angle calculation unit calculates a motor angle based on a signal from a rotation angle sensor that detects a rotation position of the rotor. An energization control unit drives the rotor so that the motor angle becomes a target angle according to the target shift range, and stops the rotor at a position where the motor angle becomes the target angle, by controlling the energization of the motor winding.

The zero point estimation unit estimates a speed 0 point, which is the timing at which the rotational speed of the vibrating rotor becomes 0 during the stop control for stopping the rotor. The energization control unit switches the current control at the estimated speed 0 point. As a result, the motor can be stopped accurately.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In an assumable example, a motor control device controls the drive of a motor that is a drive source of a range switching mechanism. The motor control device drives the rotor to a target position by feedback control, and performs a target position stop holding process for energizing by selecting an energizing phase so as to stop and hold a position at the end of feedback control for a predetermined time.

By the way, in a motor in which a rotor has a magnet, for example, like a DC brushless motor, when the motor control device stops the rotor by a fixed phase energization, the rotor may continue to vibrate due to an action and reaction of magnet between the rotor and a stator. If the energization is turned off while the rotor is vibrating, the rotor may not be stopped accurately depending on the timing at which the energization is turned off. An object of the present disclosure is to provide a shift range control device capable of stopping a motor with high accuracy.

Hereinafter, a shift range control device will be described with reference to the drawings. Hereinafter, in a plurality of embodiments, a substantially equivalent configuration will be denoted by an identical reference, and explanation thereof will be omitted.

First Embodiment

Figure 1:
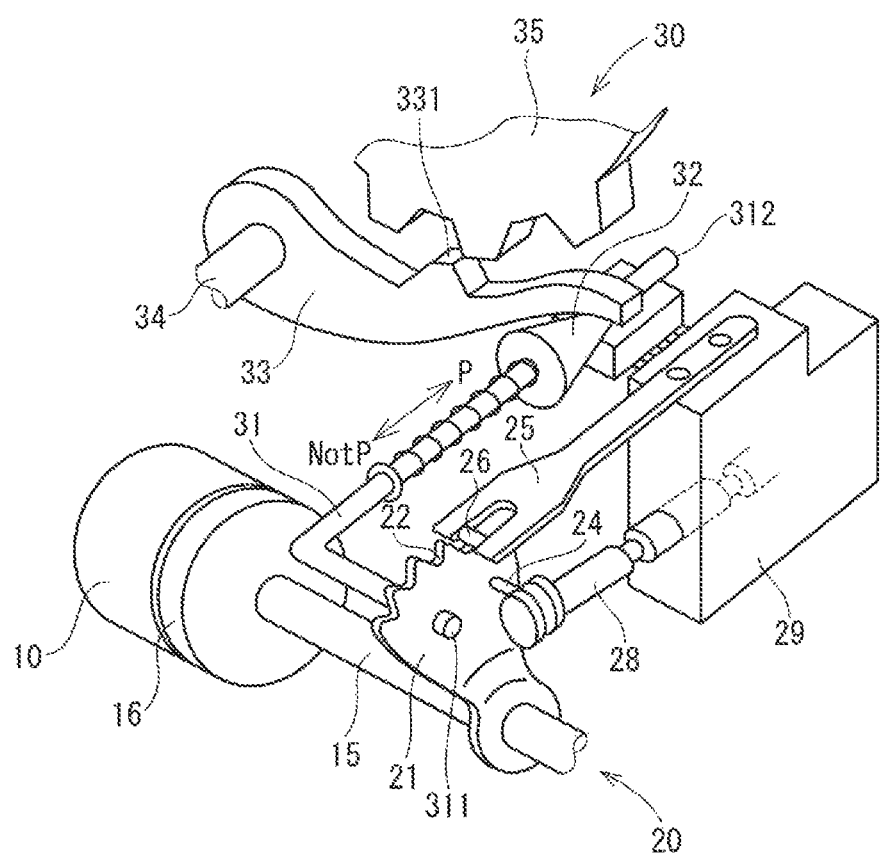
FIG. 1 is a perspective view showing a shift-by-wire system according to a first embodiment.
Figure 2:
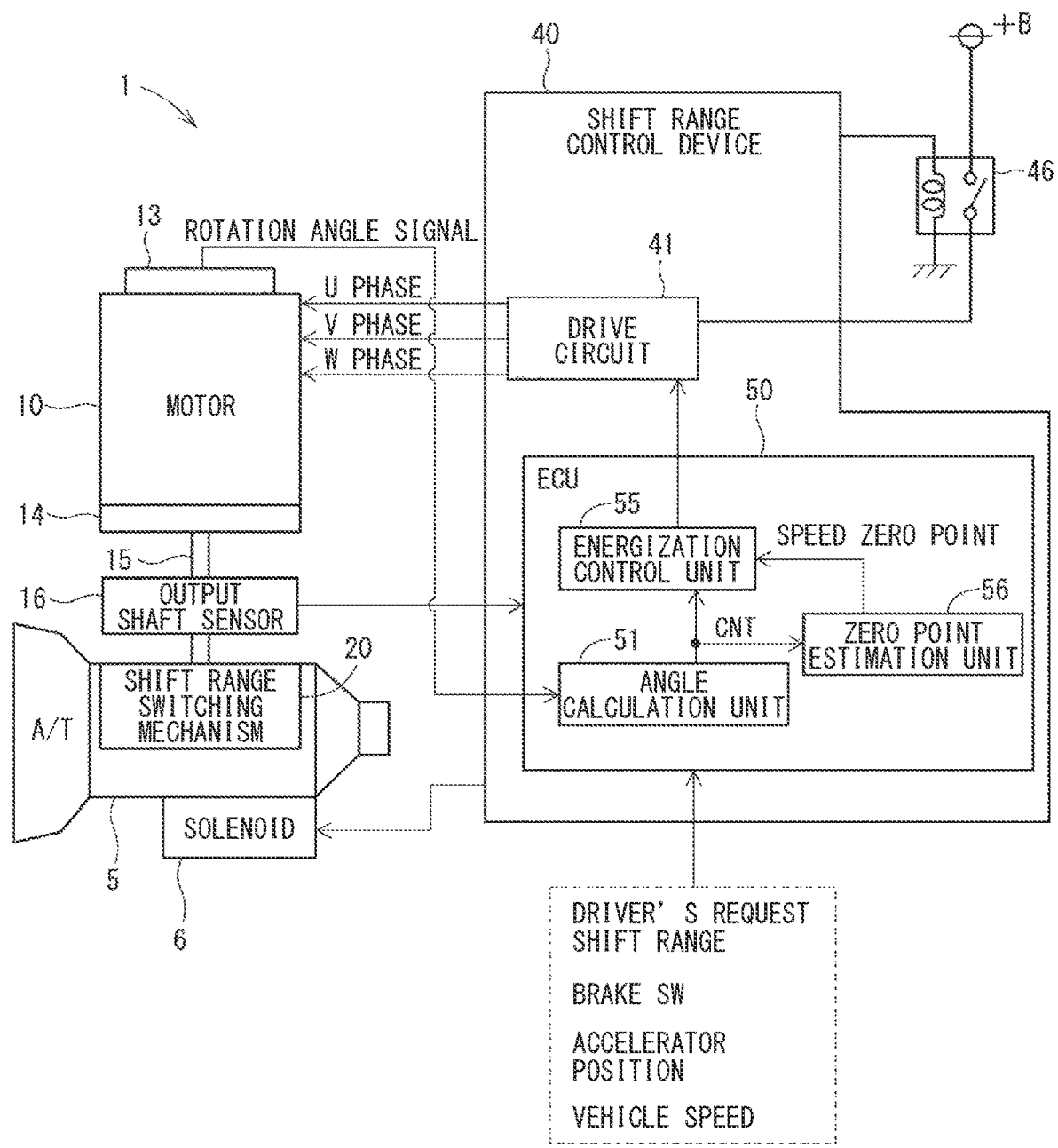
FIG. 2 is a diagram showing a schematic configuration of the shift-by-wire system according to the first embodiment.

The first embodiment is shown in FIGS. 1 to 11. As shown in FIGS. 1 and 2, a shift-by-wire system 1 includes, for example, a motor 10, a shift range switching mechanism 20, a parking lock mechanism 30, and a shift range control device 40, and the like.

Figure 3:
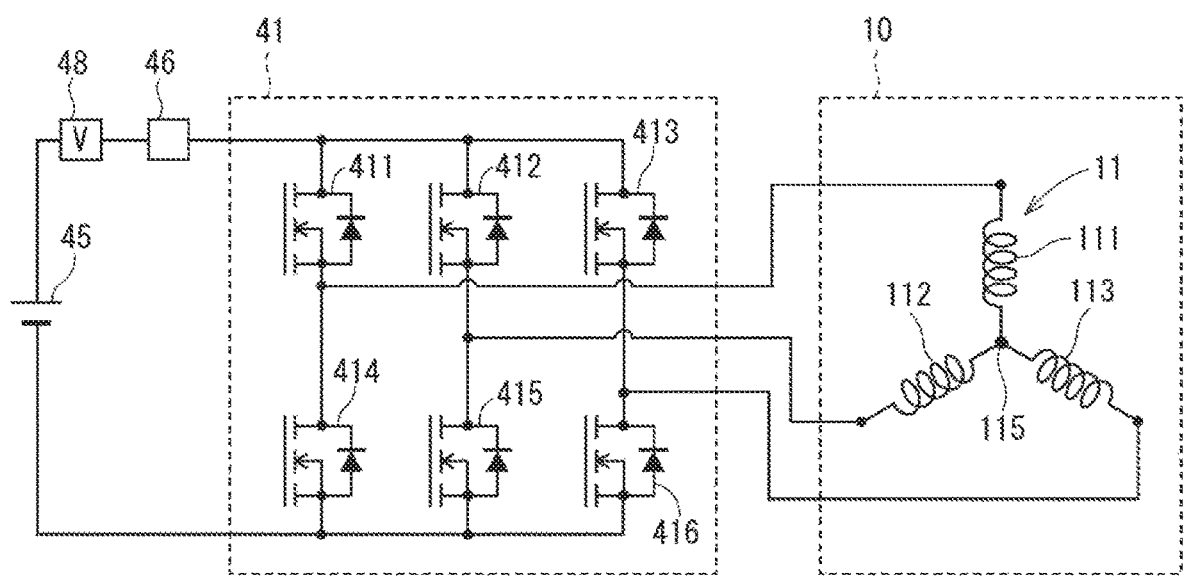
FIG. 3 is a circuit diagram showing a motor winding and a drive circuit according to the first embodiment.
Figure 4:
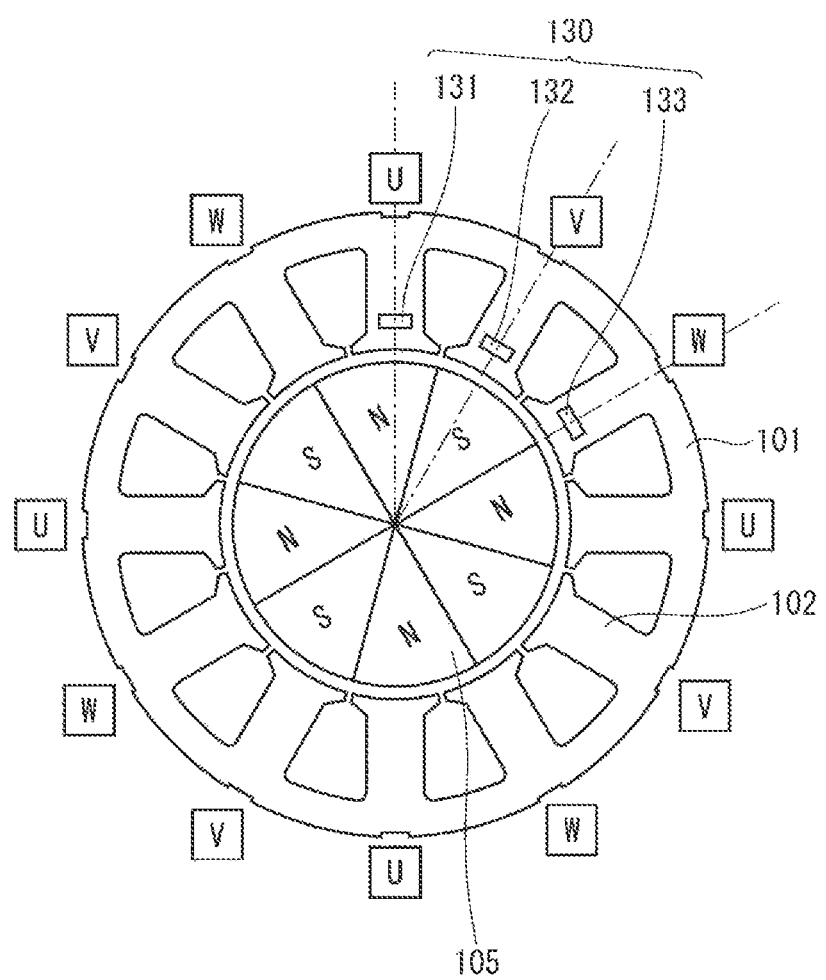
FIG. 4 is a schematic view showing a rotation angle sensor according to the first embodiment.

The motor 10 rotates when an electric power is supplied from a battery 45 (see FIG. 3) mounted on a vehicle (not shown), and functions as a driving source of the shift range switching mechanism 20. The motor 10 of the present embodiment is a permanent magnet type DC brushless motor. As shown in FIGS. 3 and 4, the motor 10 has a stator 101, a rotor 105, and a motor winding 11. The motor winding 11 has a U-phase coil 111, a V-phase coil 112, and a W-phase coil 113, and is wound around a teeth 102 of the stator 101. A permanent magnet is provided on the rotor 105.

In the present embodiment, the number of salient poles of the stator 101 is 12, and the number of magnetic poles of the rotor 105 is 8.

The rotation angle sensor 13 detects a rotation position of the rotor 105 and outputs a rotation angle signal to an ECU 50. As shown in FIG. 4, the rotation angle sensor 13 of the present embodiment is, for example, a magnetic rotary encoder, and is a three-phase encoder having a magnet plate (not shown) that rotates integrally with the rotor 105, and detection elements 131, 132, 133 (collectively labeled as 130 in FIG. 4).

Figure 5:
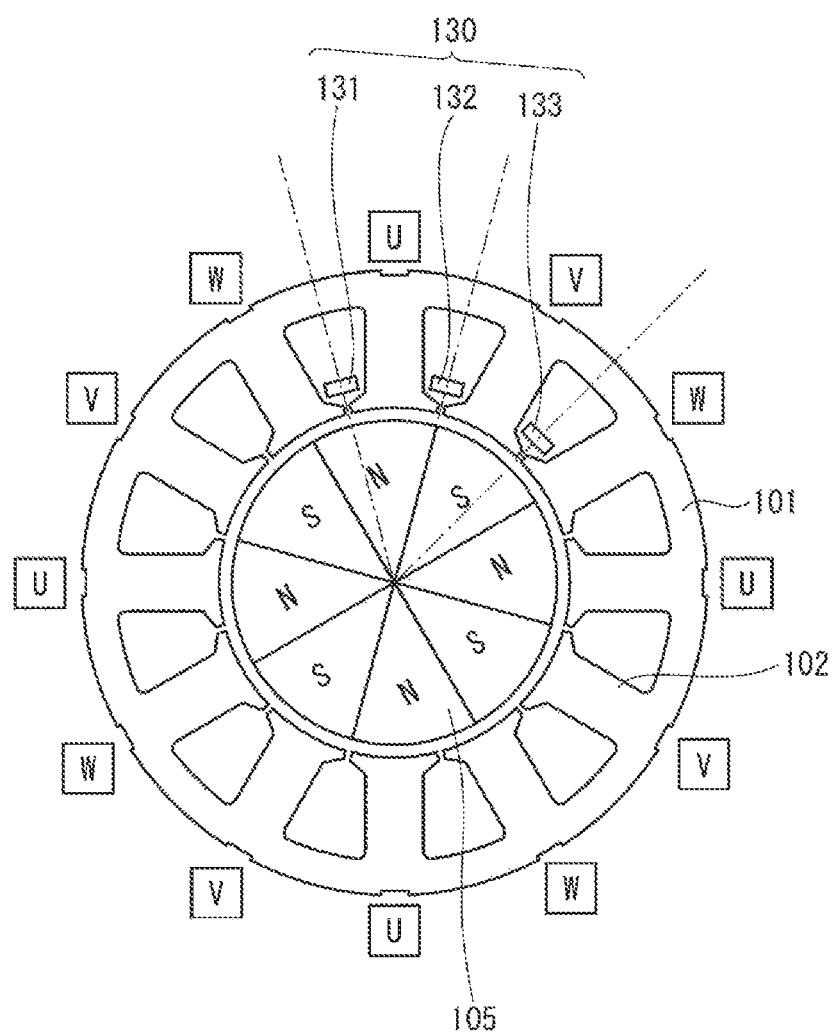
FIG. 5 is a schematic view showing a rotation angle sensor according to the first embodiment.

The detection elements 131 to 133 detect the magnetism of the magnet plate, and are, for example, Hall ICs. The detection elements 131 to 133 may be other than the Hall IC. The detection elements 131 to 133 are arranged so that the phases of the rotation angle signals are shifted by 120° in an electric angle. In the present embodiment, the detection elements 131 to 133 are respectively arranged at the center of three adjacent U-phase, V-phase, and W-phase teeth 102. Further, as shown in FIG. 5, the detection elements 131 to 133 may be arranged at the center of the two teeth 102. By arranging in this way, a signal edge is generated at a stable point when two-phase energization is performed.

As shown in FIG. 2, a decelerator 14 is provided between a motor shaft of the motor 10 and an output shaft 15 to decelerate the rotation of the motor 10 and output the decelerated rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 includes a detent plate 21, a detent spring 25 and the like. The shift range switching mechanism 20 transmits the rotational drive force output from the decelerator 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

On the detent spring 25 side of the detent plate 21, four recesses 22 for holding the manual valve 28 at positions corresponding to the respective ranges are provided. The recesses 22 each correspond to each of the shift ranges of D (drive), N (neutral), R (reverse), and P (park) ranges from a proximal end of the detent spring 25.

The detent spring 25 is an elastically deformable plate-like member, and is provided with a detent roller 26 at a tip of the detent spring 25. The detent roller 26 fits into one of the recesses 22. The detent spring 25 urges the detent roller 26 toward a rotation center of the detent plate 21. When a rotational force equal to or greater than a predetermined force is applied to the detent plate 21, the detent spring 25 is elastically deformed, and the detent roller 26 moves in the recesses 22. When the detent roller 26 is fitted to any of the recesses 22, swing of the detent plate 21 is regulated. Accordingly, an axial position of the manual valve 28 and a state of the parking lock mechanism 30 are determined to fix a shift range of an automatic transmission 5.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the recess corresponding to the P range, the conical member 32 moves in the direction of the arrow P.

The parking lock pole 33 comes into contact with a conical surface of the conical member 32 and is provided so as to be swingable around the shaft part 34. On the parking gear 35 side of the parking lock pole 33, a protrusion 331 that can mesh with the parking gear 35 is provided. When the conical member 32 moves in the direction of the arrow P due to the rotation of the detent plate 21, the parking lock pole 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIGS. 2 and 3, the shift range control device 40 includes a drive circuit 41, an ECU 50, and the like. The drive circuit 41 is a three-phase inverter that switches the energization of a motor winding 11, and the switching elements 411 to 416 are bridge-connected. The switching elements 411 and 414 are paired and belong to U phase. The switching elements 411 and 414 have a connection point therebetween, and the connection point is connected with one end of an U phase coil 111. The switching elements 412 and 415 are paired and belong to V phase. The switching elements 412 and 415 have a connection point therebetween, and the connection point is connected with one end of a V phase coil 112. The switching elements 413 and 416 are paired and belong to W phase. The switching elements 413 and 416 have a connection point therebetween, and the connection point is connected with one end of a W phase coil 113. The other ends of the coils 111 to 113 are connected to each other at a connected portion 115.

A motor relay 46 is provided between the drive circuit 41 and the battery 45. When the motor relay 46 is turned on, power supply from the battery 45 to the motor 10 side is allowed, and when it is turned off, the power supply from the battery 45 to the motor 10 side is cut off. A voltage sensor 48 detects the battery voltage, which is the voltage of the battery 45.

ECU 50 is mainly composed of a microcomputer and the like, and internally includes, although not shown in the figure, a CPU, a ROM, a RAM, an I/O, a bus line for connecting these components, and the like. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

As shown in FIG. 2, the ECU 50 controls the switching of the shift range by controlling the drive of the motor 10 based on a driver-requested shift range, a signal from a brake switch, a vehicle speed, and the like. The ECU 50 controls the drive of a shift hydraulic control solenoid 6 based on the vehicle speed, an accelerator opening degree, the driver-requested shift range, and the like. The shift hydraulic control solenoid 6 is controlled to manipulate a shift stage. The number of the shift hydraulic control solenoids 6 is determined according to the shift stage or the like. According to the present embodiment, a singular ECU 50 performs the control to drive the motor 10 and the solenoid 6. It is noted that, the ECU may be divided into a motor ECU, which is for motor control to control the motor 10, and an AT-ECU, which is for solenoid control. Hereinafter, a drive control of the motor 10 will be mainly described.

The ECU 50 includes an angle calculation unit 51 an energization control unit 55, and a zero point estimation unit 56. The angle calculation unit 51 detects a pulse edge of each phase of the encoder signal, which is the rotation angle signal output from the rotation angle sensor 13, and calculates an encoder count value CNT. In the present embodiment, a rotation direction when switching the range from the P range side to the D range side is set to a forward rotation direction, and the encoder count value CNT is counted up. Further, the rotation direction when switching the range from the D range side to the P range side is set to the reverse rotation direction, and the encoder count value CNT is counted down. The count settings and the like of the encoder count value CNT may be different. The encoder count value CNT is a value corresponding to the rotation position of the motor 10 and corresponds to the "motor angle". Hereinafter, the pulse edge of each phase of the encoder signal is appropriately referred to as an "encoder edge".

The energization control unit 55 generates a drive signal related to the drive control of the motor 10 so that the encoder count value CNT becomes the target count value CNT_T set according to the target shift range. The generated drive signal is output to the drive circuit 41. The drive of the motor 10 is controlled by switching the switching elements 411 to 416 on and off according to the drive signal and controlling the energization of the motor winding 11. In the present embodiment, the target count value CNT_T corresponds to the "target angle".

When the target shift range is changed, the energization control unit 55 drives the motor 10 by feedback control. In the drawing, the feedback is described as "F/B". Specifically, the rotor 105 is rotated by energizing the energizing phase according to the encoder count value CNT and switching the energizing phase according to the encoder count value CNT. When the encoder count value CNT falls within a predetermined range including the target count value CNT_T (for example, CNT_T±2 counts), the feedback control is switched to the stop control and the motor 10 is stopped. Hereinafter, when the encoder count value CNT reaches a predetermined range including the target count value CNT_T, it is simply referred to as "reaching the target". Further, the count value for starting the stop control is set to a stop control start count value CNT_S.

In the present embodiment, as the stop control, a stationary phase energization control to the two phases is performed by turning on the switching element on the upper side of one phase and the switching element on the lower side of the other one phase. For example, by turning on the switching elements 413 and 415, WV phase energization in which a current flows through the paths of the switching element 413, the W phase coil 113, the connection portion 115, the V phase coil 112, and the switching element 415 is achieved.

The zero point estimation unit 56 estimates a speed 0 point, which is the timing when the rotation speed of the rotor 105 becomes 0, based on the vibration cycle of the rotor 105 during the fixed phase energization control. The energization control unit 55 switches the energization control at the estimated speed 0 point.

The motor 10 of the present embodiment is a DC brushless motor, and the rotor 105 has a permanent magnet. Therefore, when the fixed phase energization is performed to the two phases, the rotor 105 may continue to vibrate due to the action and reaction of the magnet between the rotor 105 and the stator 101.

Figure 6:
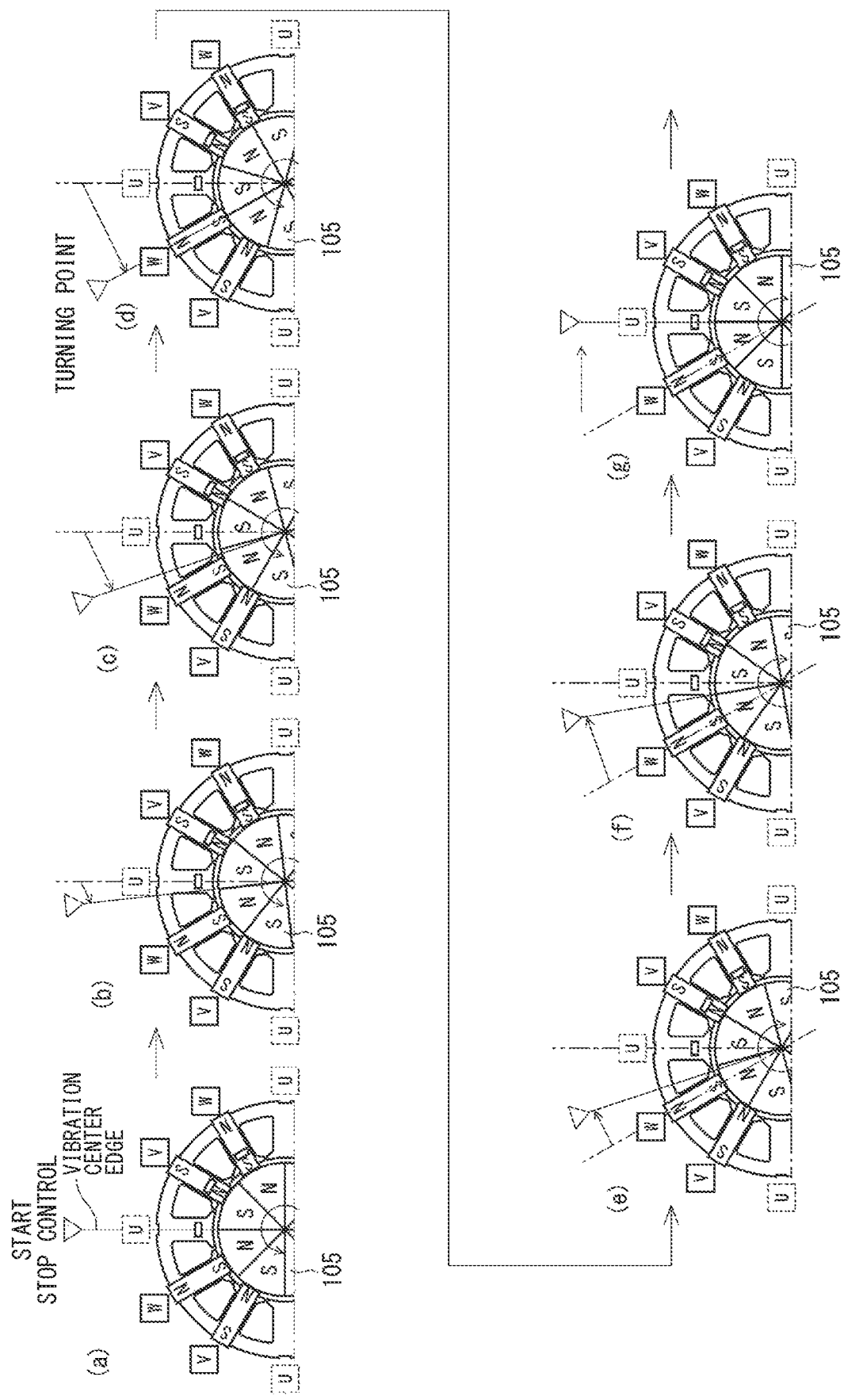
FIG. 6 is an explanatory diagram for explaining a vibration of a rotor in a stop control according to the first embodiment.

The vibration of the rotor 105 will be described with reference to FIG. 6. In FIG. 6, the rotation direction of the rotor 105 when the stop control is started at (a) is a counterclockwise direction, and the rotation position of the rotor 105 changes in the order of (a)→(b)→(c)→(d)→(e)→(f)→(g).... A white triangular mark indicates a reference position of the rotor 105. Further, in FIG. 6, the WV phase energization is performed in the stop control, the VW phase of the energized phase is shown by a solid line, and the U phase of the non-energized phase is shown by a broken line.

In FIG. 6, in the state of (a), the encoder edge is detected, the encoder count value CNT is counted up, and the stop control is started. The encoder count value CNT at this time is set to a stop control start count value CNT_S. Further, the energized phase corresponding to the encoder count value CNT is the WV phase, the switching elements 413 and 415 are turned on, and the fixed phase energization is performed by the WV phase energization.

When the state of (c) is reached after the state of (b), a boundary between the S pole and the N pole of the rotor 105 passes through the detection element and the encoder edge is generated, so that the encoder count value CNT is incremented by +1. In the state of (d), when the speed of the rotor 105 becomes 0, the rotation direction of the rotor 105 is opposite, that is, it changes in the clockwise direction. The state of (d) is the turning point. The turning point is a position corresponding to the vibration energy of the rotor 105 and the like. The position of the rotor 105 in the state of (e) is the same as that in the state of (c), an encoder edge is generated, and the encoder count value CNT is decremented by −1. Then, after passing through the state of (f), the state of (g) is reached. The position of the rotor 105 in the state of (g) is the same as that in the state of (a), an encoder edge is generated, and the encoder count value CNT is decremented by −1. The rotor 105 further rotates in the clockwise direction until the speed reaches 0, and when the speed reaches 0, the rotation direction changes counterclockwise. In this way, the rotor 105 vibrates around the positions shown in the state of (a) and (g). During the stop control, the rotor 105 is accelerated when the rotor 105 is moving toward the states (a) and (g). On the other hand, when the rotor 105 leaves the states (a) and (g), the rotor 105 is decelerated. Further, when the rotor 105 passes through a vibration center Lc shown in the state of (a) and (g), the rotation speed peaks.

If the stop control is terminated and the energization to the motor winding 11 is turned off while the rotor 105 is vibrating, the rotor 105 rotates depending on the timing of turning off, and in some cases, the output shaft 15 is pushed up. Therefore, there is a risk of unintentionally switching to a range different from the target range. Therefore, in the present embodiment, the speed 0 point at which the rotation speed of the rotor 105 becomes 0 is estimated from the vibration cycle of the rotor 105, and the energization is turned off at the speed 0 point, so that overshoot or undershoot does not occur. Therefore, the rotor 105 is stopped within the control range.

Figure 7:
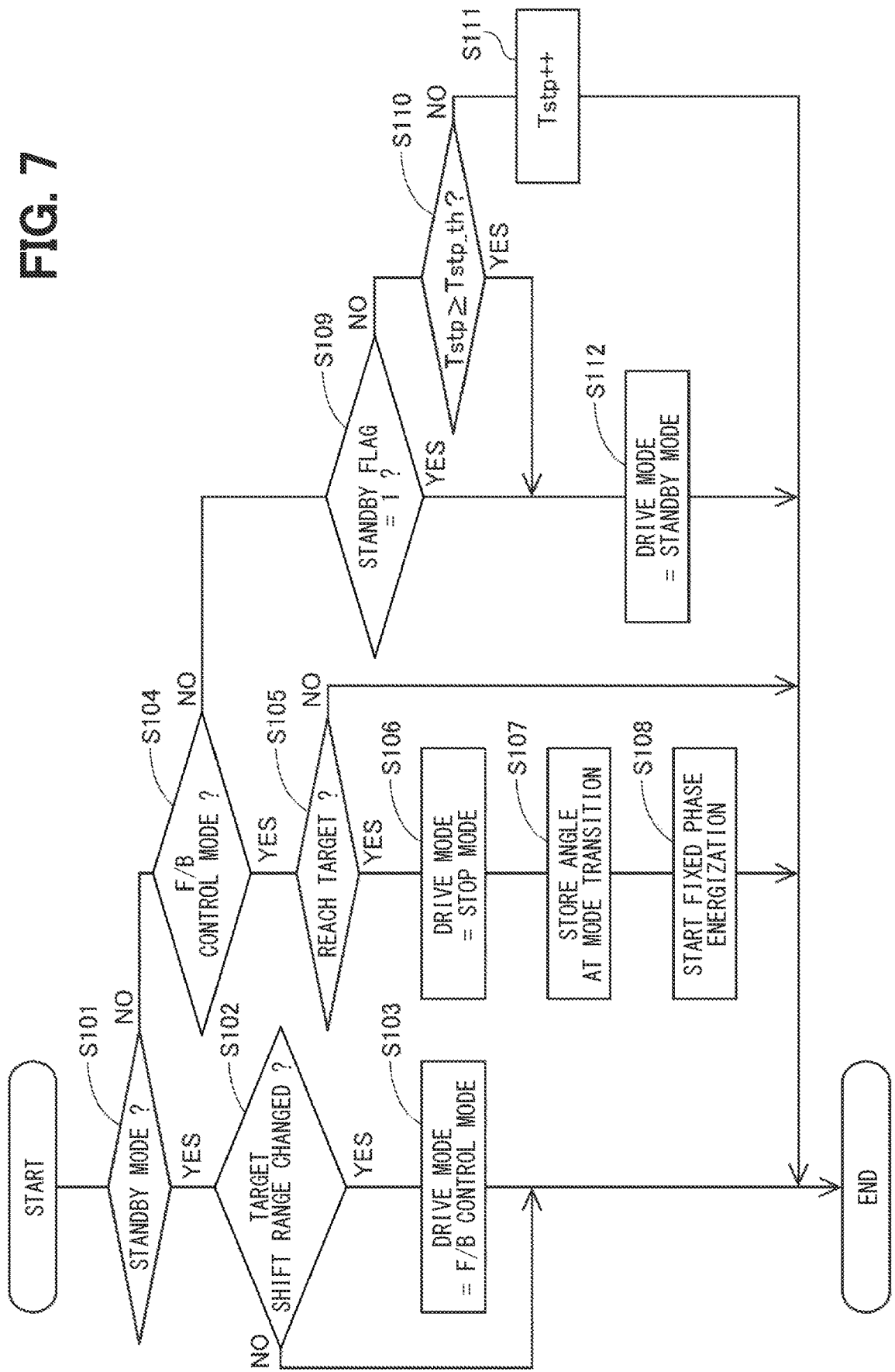
FIG. 7 is a flowchart illustrating a driving control process according to the first embodiment.

The drive control process of the present embodiment will be described with reference to a flowchart of FIG. 7 This process is executed by the ECU 50 at a predetermined cycle (for example, 1 [ms]). Hereinafter, "step" in step S101 is omitted, and is simply referred to as a symbol "S." The same applies to the other steps. In the present embodiment, after the computer is initialized, a standby mode is set.

In S101, the ECU 50 determines whether or not the drive mode is the standby mode. When it is determined that the drive mode is not the standby mode (S101: NO), the process proceeds to S104. If it is determined that the drive mode is the standby mode (YES in S101), the process proceeds to S102.

In S102, the ECU 50 determines whether or not the target shift range has been changed to another. When it is determined that the target shift range has not been switched (S102: NO), the standby mode is continued. When it is determined that the target shift range has been switched (S102: YES), the process proceeds to S103, and the drive mode is switched to the feedback control mode.

In 3104, the ECU 50 determines whether or not the drive mode is the feedback control mode. When it is determined that the drive mode is not the feedback control mode (S104: NO), that is, when the drive mode is the stop mode, the process proceeds to S100. When it is determined that the drive mode is the feedback control mode (S104: YES), the process proceeds to S105.

In S105, the ECU 50 determines whether or not the encoder count value CNT has reached a predetermined range including the target count value CNT_T. When it is determined that the encoder count value CNT has not reached the predetermined range including the target count value CNT_T (S105: NO), the feedback control mode is continued. When it is determined that the encoder count value CNT has reached the predetermined range including the target count value CNT_T (S105: YES), the process proceeds to S106 and the drive mode is switched to the stop mode.

In S107, the ECU 50 stores the angle at the time of transition to the stop mode in a RAM or the like (not shown). Here, the stop control start count value CNT_S is stored. In S108, the energization control unit 55 starts the fixed phase energization.

In S109, which proceeds when the drive mode is the stop mode, the ECU 50 determines whether or not the standby flag, which will be described later, is set. In the figure, a state in which each flag is set is set to "1", and a state in which the flag is not set is set to "0", If it is determined that the standby flag is set (S109: YES), the process proceeds to S112. If it is determined that the standby flag is not set (S109: NO), the process proceeds to S110.

In S110, the ECU 50 determines whether or not an elapsed time Tstp from the start of the stop control is equal to or greater than a progress determination threshold value Tstp_th. When it is determined that the elapsed time Tstp is less than the progress determination threshold value Tstp_th (S110: NO), the process proceeds to Sill and the elapsed time Tstp is counted up. When it is determined that the elapsed time Tstp is equal to or greater than the progress determination threshold Tstp_th (S110: YES), the process proceeds to S112.

In S112, which proceeds when the standby flag is set (S109: YES) or when it is determined that the elapsed time Tstp from the start of stop control is equal to or greater than the progress determination threshold value Tstp_th (S110: YES), the ECU 50 switches the drive mode to the standby mode and turns off all the switching elements 411 to 416.

The speed 0 point estimation process will be described with reference to the flowchart of FIG. 8. This process is interrupted and performed when an edge of the encoder signal is detected. Similarly, priority is given to the process related to the drive control of the motor 10 that is interrupted and performed when the encoder edge is detected, and the speed 0 point estimation process is executed thereafter.

In S201, the zero point estimation unit 56 determines whether or not the drive mode is the stop mode. If it is determined that the drive mode is not the stop mode (S201: NO), the routine is terminated without performing the subsequent process. When it is determined that the drive mode is the stop mode (S201: YES), the process proceeds to S202.

In S202, the zero point estimation unit 56 calculates a period estimation time Tc. Here, the edge-to-edge elapsed time Tedg, which is the elapsed time from the previous encoder edge detection to the current encoder edge detection, is added to the previous value of the period estimation time Tc (see equation (1)). (n−1) in the equation means that it is the previous value.

$$Tc = Tc(n-1) + Tedg \qquad (1)$$

In S203, the zero point estimation unit 56 determines whether or not the rotor 105 has passed through the vibration center Lc based on the encoder count value CNT.

The determination of whether or not the rotor has passed through the vibration center Lc will be described. When the current rotation direction of the rotor 105 is the same as the rotation direction before the start of stop control, it is determined that the rotor 105 has passed through the vibration center Lc when the equation (2) is satisfied. When the rotation direction before the start of the stop control is the forward rotation direction (that is, the P D direction) and the rotation direction of the current rotor 105 is different from the rotation direction before the start of the stop control, it is determined that the rotor 105 has passed through the vibration center Lc when the equation (3) is satisfied. When the rotation direction before the start of stop control is the reverse rotation direction (that is, the D→P direction) and the current rotation direction of the rotor 105 is different from the rotation direction before the start of stop control, it is determined that the rotor 105 has passed through the vibration center Lc when the equation (4) is satisfied.

$$CNT\_S - CNT = 0 \qquad (2)$$

$$CNT\_S - CNT = -1 \qquad (3)$$

$$CNT\_S - CNT = 1 \qquad (4)$$

If it is determined that the rotor 105 has not passed through the vibration center Lc (S203: NO), the process after S204 is not performed, and this routine is terminated. When it is determined that the rotor 105 has passed through the vibration center Lc (S203: YES), the process proceeds to S204.

In S204, the zero point estimation unit 56 calculates a speed 0 point estimation time Tzero, which is the time until the speed of the rotor 105 becomes 0 next (see equation (5)). In S205, the zero point estimation unit 56 starts a speed 0 point timing timer Ttime.

$$Tzero = Tc/2 \quad (5)$$

The zero point estimation unit 56 resets the period estimation time Tc in S206, and increments the center passing counter Cpass in S207. In an embodiment in which the value of the center passing counter Cpass is not used, S207 may be omitted. The same applies to S507, which will be described later.

Figure 9:
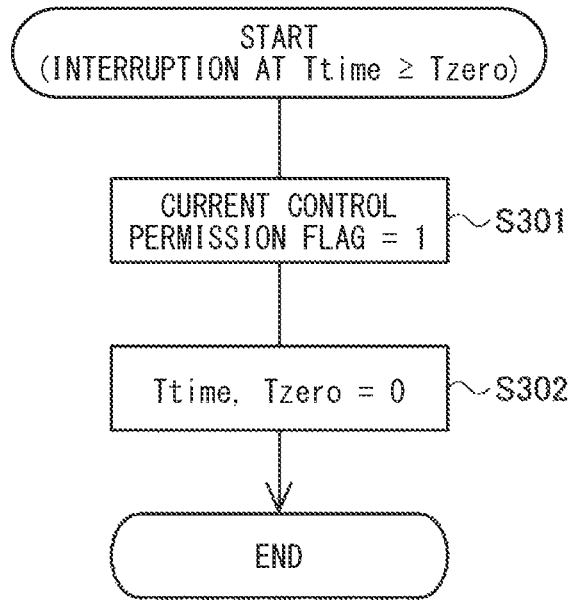
FIG. 9 is a flowchart illustrating a current control change permission process according to the first embodiment.

The current control change permission process will be described with reference to the flowchart of FIG. 9. In this process, the timer is interrupted and performed at the timing when the speed 0 point timing timer Ttime becomes equal to or longer than the speed 0 point estimation time Tzero. In S301, the zero point estimation unit 56 sets the current control permission flag. In S302, the zero point estimation unit 56 resets the speed 0 point timing timer Ttime and the speed 0 point estimation time Tzero.

Figure 10:
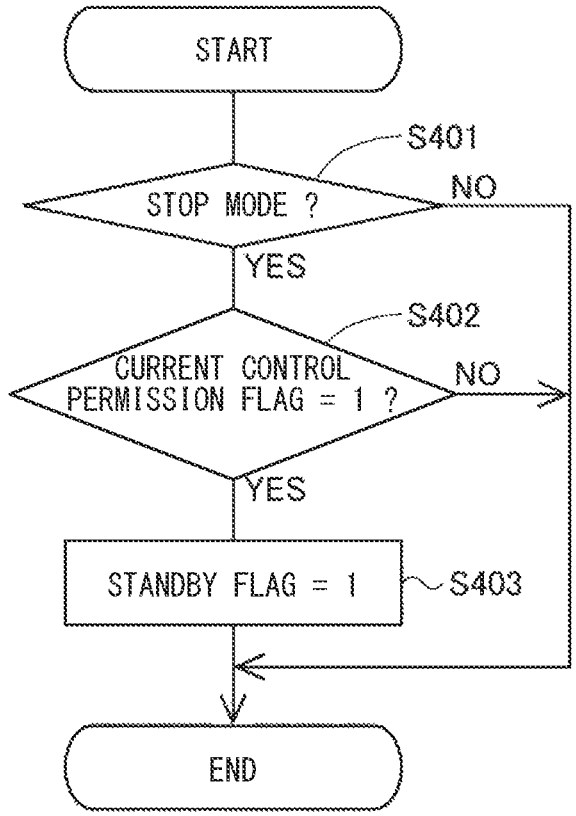
FIG. 10 is a flowchart illustrating a current control process according to the first embodiment.

The current control process will be described with reference to the flowchart of FIG. 10. This process is executed at a predetermined cycle (for example, 1 [ms]). In S401, the ECU 50 determines whether the drive mode is the stop mode. If it is determined that the drive mode is not the stop mode (S401: NO), the routine is terminated without performing the subsequent process. When it is determined that the drive mode is the stop mode (S401: YES), the process proceeds to S402.

In S402, the ECU 50 determines whether or not the current control permission flag is set. If it is determined that the current control permission flag is not set (S402: NO), the process of S403 is not performed and this routine is terminated. If it is determined that the current control permission flag is set (S402: YES), the process proceeds to S403 and the standby flag is set. When the standby flag is set, an affirmative judgment is made in S109 in FIG. 7, the mode shifts to the standby mode, and the energization is turned off. That is, in the present embodiment, the energization is turned off at the timing when the speed reaches 0 point.

Figure 11:
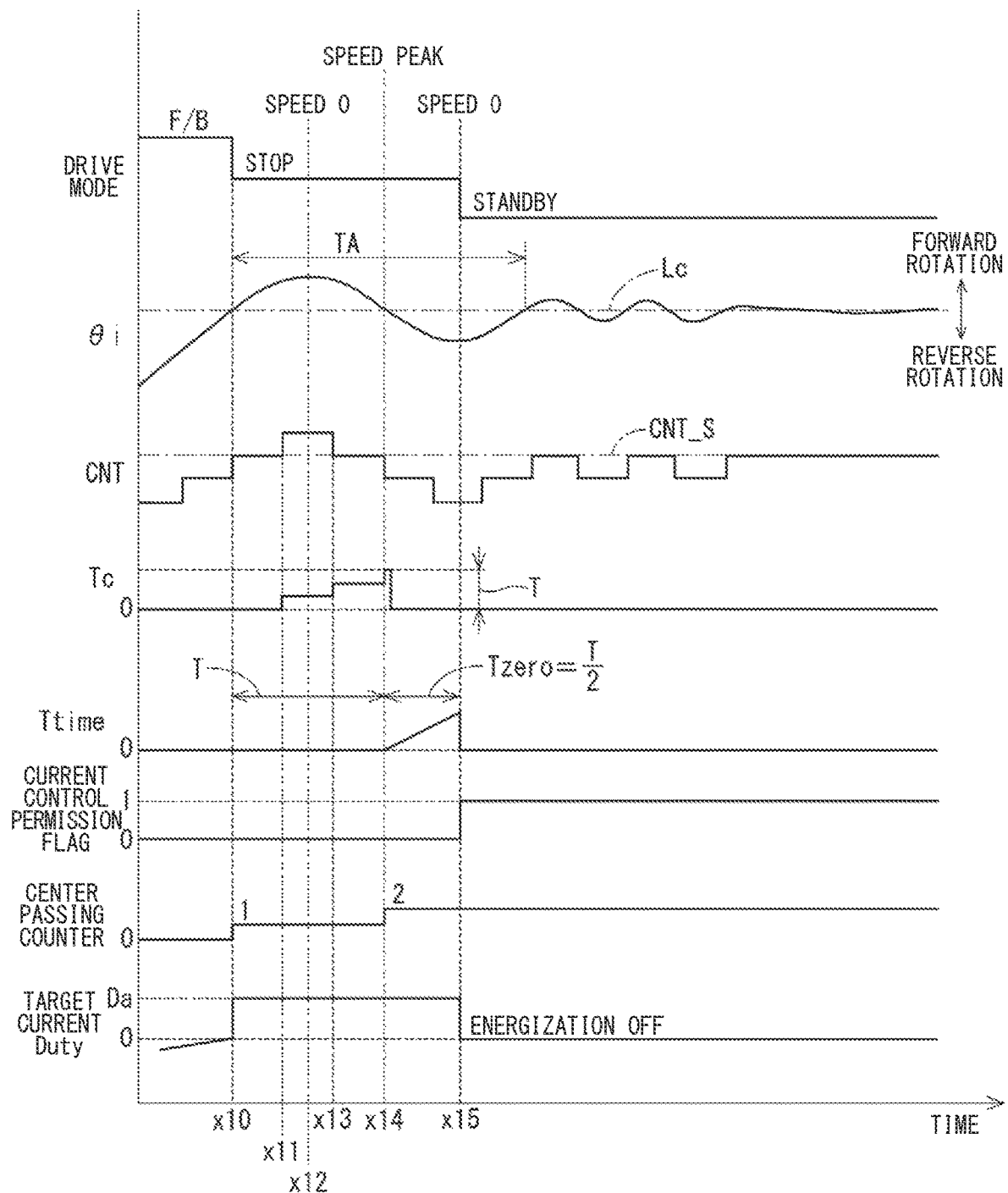
FIG. 11 is a time chart illustrating motor drive control according to the first embodiment.

The motor drive control of the present embodiment will be described with reference to the time chart of FIG. 11. In FIG. 11, it is assumed that the rotor 105 is rotating in the forward direction (that is, the P→D direction) before the start of the stop control. In FIG. 11, the drive mode, the rotor displacement amount θi, the encoder count value CNT, the cycle estimation time Tc, the speed 0 point timing timer Ttime, the current control permission flag, the center passing counter Cpass, and the target current duty are shown from an upper stage. It is noted that, for the purpose of explanation, the time scale and the like are changed appropriately. Generally, the period indicated by TA is one cycle of vibration, but in the present specification, a half cycle (for example, the period indicated by "T" in the figure) until the rotor 105 leaves the vibration center Lc and passes through the vibration center Lc again is referred to as a vibration cycle. The same as above applies to FIG. 13 and the like.

When the encoder count value CNT reaches a predetermined range including the target count value CNT_T at time x10, the drive mode is switched from the feedback control mode to the stop mode, and fixed phase energization is performed on the energized phase according to the encoder count value CNT. Further, the encoder count value CNT at this time is held as the stop control start count value CNT_S, and the center passing counter Cpass is incremented. Further, the target current duty is set to a fixed phase energization duty Da, and the switching element of the energization phase is turned on and off at a set duty. The fixed phase energization duty Da can be arbitrarily set. The position of the rotor 105 at this time is as shown in (a) in FIG. 6.

When the rotor 105 rotates to the position shown in the state of (C) in FIG. 6 at time x11, the encoder edge is detected and the encoder count value CNT is incremented by +1. Further, the time from the time x10 to the time x11, which is the edge-to-edge elapsed time Tedg, is added to the cycle estimation time Tc.

At time x12, when the rotation speed of the rotor 105 becomes 0 at the position shown in (d) in FIG. 6, the rotation direction of the rotor 105 is reversed and the rotor 105 accelerates toward the vibration center Lc. When the encoder edge is detected at time x13, the encoder count value CNT is decremented by −1, and the encoder count value CNT returns to the stop control start count value CNT_S. Further, the time from the time x11 to the time x13, which is the edge-to-edge elapsed time Tedg, is added to the cycle estimation time Tc.

When the encoder edge is detected at time x14, the encoder count value CNT is decremented by −1. Further, when the time from the time x13 to the time x14, which is the edge-to-edge elapsed time Tedg, is added to the cycle estimation time Tc, the cycle estimation time Tc becomes the time from the time x10 to the time x14.

At time x14, the encoder count value CNT becomes (CNT_S−1), and it is estimated that the rotor 105 is located at the vibration center Lc. Further, the rotation speed when the rotor 105 passes through the vibration center Lc becomes the peak, and when the rotor 105 rotates in the direction away from the vibration center Lc, the rotation speed of the rotor 105 decreases.

That is, at time x10, the rotor 105 passes through the vibration center Lc in the forward rotation, and at time x14, the rotor 105 passes through the vibration center Lc again in the reverse rotation. Therefore, in the present embodiment, at time x14, the period estimation time Tc after adding the edge-to-edge elapsed time Tedg from time x13 to time x14 is regarded as the vibration cycle T of the rotor 105. Then, it is estimated that the time x15 when ½ of the vibration period T elapses from the time x14 becomes the speed 0 point at which the rotation speed of the rotor 105 becomes 0.

Specifically, at time x14, the speed 0 point estimation time Tzero is calculated, and the speed 0 point timing timer Ttime is started. Further, after the speed 0 point estimation time Tzero is calculated, the cycle estimation time Tc is reset and the center passing counter Cpass is incremented. Then, the time x15 at which the speed 0 point timing timer Ttime becomes the speed 0 point estimation time Tzero is regarded as the speed 0 point, and the current control permission flag is set at the time x15. When the current control permission is set, the change of the current control is allowed. In the present embodiment, as a change of the current control, the drive mode is set to the standby mode, and the energization of the motor winding 11 is turned off. By turning off the energization at the speed 0 point, the vibration converges within the control range without overshooting or undershooting, and the rotor 105 can be stopped at an appropriate position.

As described above, the shift range control device 40 according to the present embodiment switches the shift range by controlling the drive of the motor 10 in which the rotor 105 rotates by energizing the motor winding 11, and includes an angle calculation unit 51, an energization control unit 55, and a zero point estimation unit 56. The angle calculation unit 51 calculates the encoder count value CNT based on the signal from the rotation angle sensor 13 that detects the rotation position of the rotor 105. The energization control unit 55 drives the rotor 105 so that the encoder count value CNT becomes the target count value CNT according to the target shift range, and controls the energization of the motor winding 11 so that the rotor 105 stops at a position where the encoder count value CNT becomes the target count value CNT_T. Here, in "the rotor stops at a position where the motor angle becomes the target angle", it also includes stopping the rotor within the control range including the target angle.

The zero point estimation unit 56 estimates the speed 0 point, which is the timing at which the rotational speed of the vibrating rotor 105 becomes 0 during the stop control for stopping the rotor 105. The energization control unit 55 switches the current control at the estimated speed 0 point. In the present embodiment, the energization control unit 55 turns off the energization at the speed 0 point. As a result, the motor 10 can be stopped with high accuracy, so that it is possible to prevent the motor 10 from shifting to an unintended range due to an overshoot or an undershoot. As described above, even if the timing is shifted due to the calculation cycle, such as setting the current control permission flag at the estimated speed 0 point and actually switching the current control to the next calculation cycle, it shall be included in the concept of "switching current control at speed 0 point".

The zero point estimation unit 56 estimates the speed 0 point based on the vibration cycle of the rotor 105 specified by using the detection value of the rotation angle sensor 13. The rotation angle sensor of the present embodiment is an encoder having detection elements 131 to 133, and the detection elements 131 to 133 are located at a position where a signal edge is generated at a position at the vibration center Lc of the rotor 105 in the stop control. Since the stop control of the present embodiment is the fixed phase energization control to two phases, the signal edge is generated at the vibration center of the rotor 105 by generating the signal edge at a stable point during two phase energization. As a result, the speed 0 point can be appropriately estimated based on the detection value of the rotation angle sensor 13.

Second Embodiment

Figure 12:
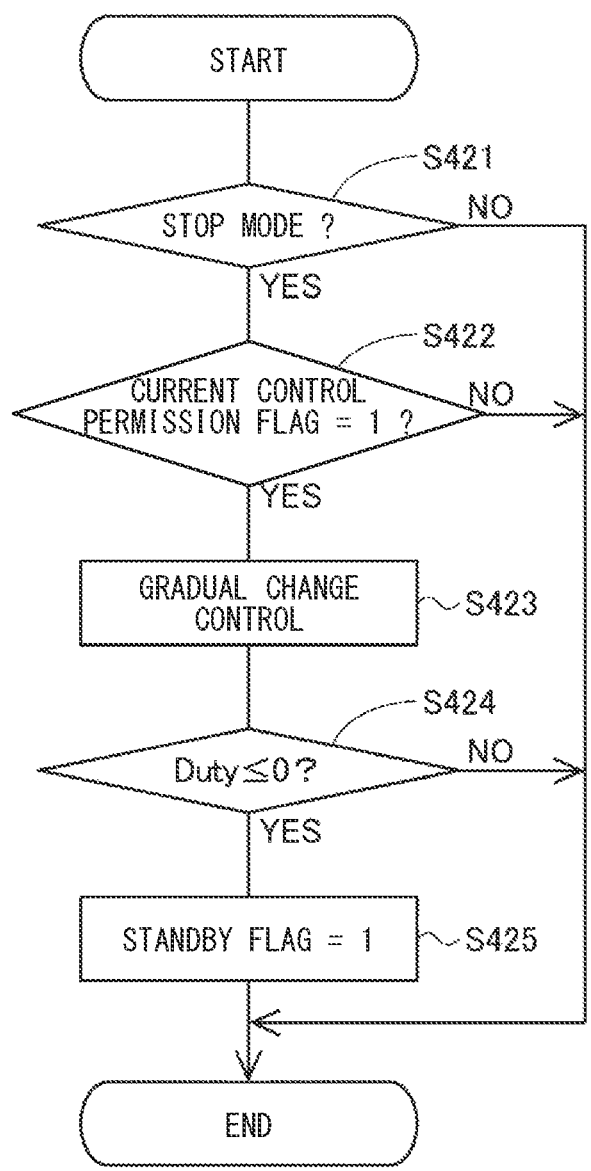
FIG. 12 is a flowchart illustrating a current control process according to a second embodiment.
Figure 13:
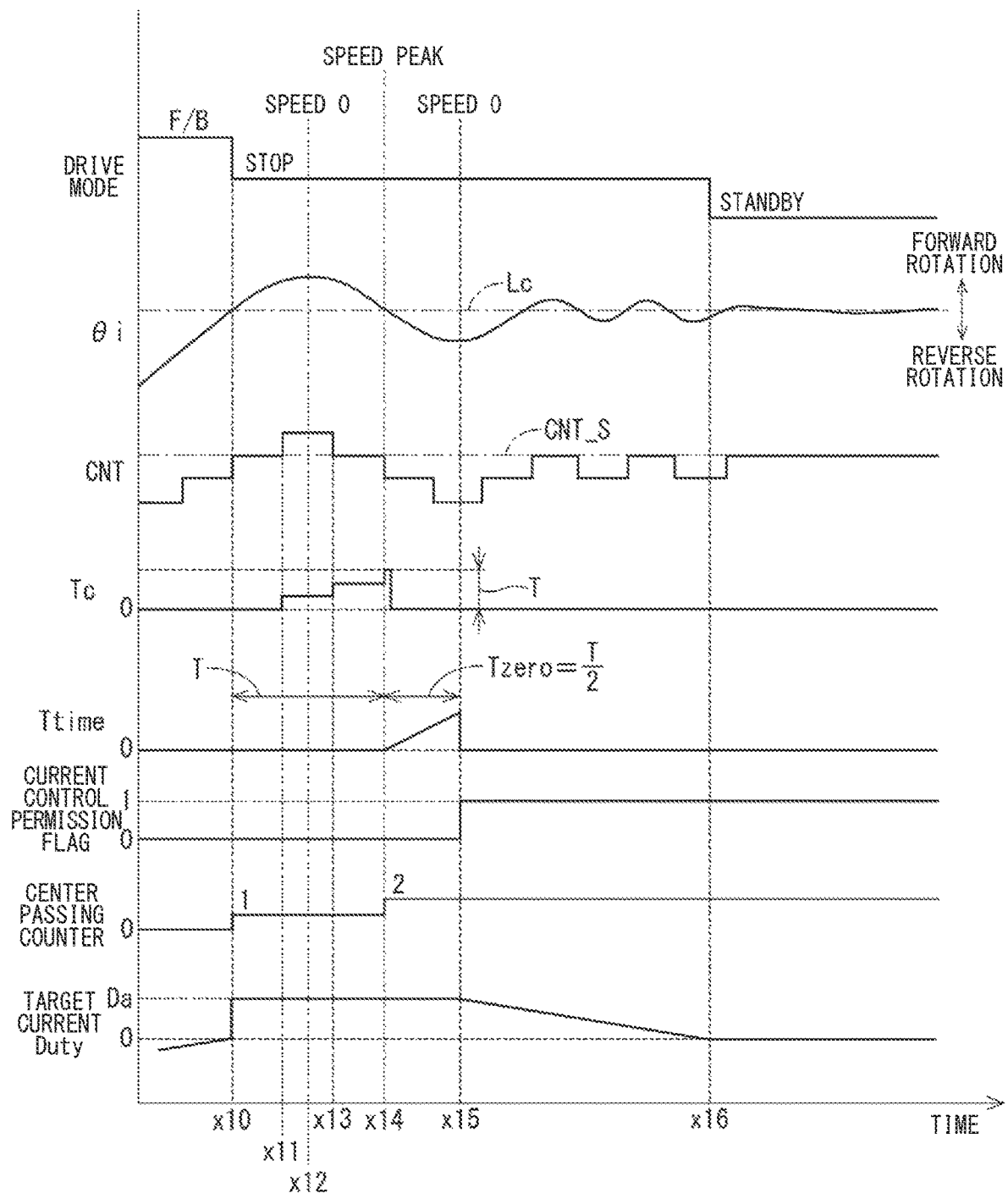
FIG. 13 is a time chart illustrating motor drive control according to the second embodiment.

A second embodiment is shown in FIGS. 12 and 13. The second embodiment and the third embodiment mainly describe the change of the current control at the speed 0 point. Since the estimation of the speed 0 point and the like are the same as those in the above embodiment, the description thereof will be omitted.

The current control process of the present embodiment is shown in FIG. 12. This process is executed at a predetermined cycle (for example, 1 [ms]) as in the process of FIG. 10. The processes in S421 and S422 is the same as the processes in S401 and S402 in FIG. 10. In S423, which proceeds to the process where it is determined in S422 that the current control permission flag is set (S422: YES), the energization control unit 55 gradually reduces the target current duty from the fixed phase energization duty Da.

In S424, the ECU 50 determines whether or not the target current duty is 0 or less. When it is determined that the target current duty is larger than 0 (S424: NO), the process of S425 is not performed and the gradual change control is continued. When it is determined that the target current duty is 0 or less (S242: YES), the process proceeds to S425 and the standby flag is set as in S403.

The motor drive process according to the present embodiment will be described with reference to the time chart of FIG. 13. The processes up to the time x15 is the same as in FIG. 11. The current control permission flag is set at the time x15 when the speed 0 point timing timer Ttime becomes the speed 0 point estimation time Tzero, and the change of the current control is permitted. In the present embodiment, the target current duty is gradually changed as a change of the current control. Then, at the time x16 when the target current duty becomes 0, the drive mode is set to the standby mode and the energization is turned off.

In the present embodiment, the energization control unit 55 gradually changes the current from the speed 0 point. As a result, the motor 10 can be stopped with high accuracy. In addition, the same effects as those of the above embodiment can be obtained.

Third Embodiment

Figure 14:
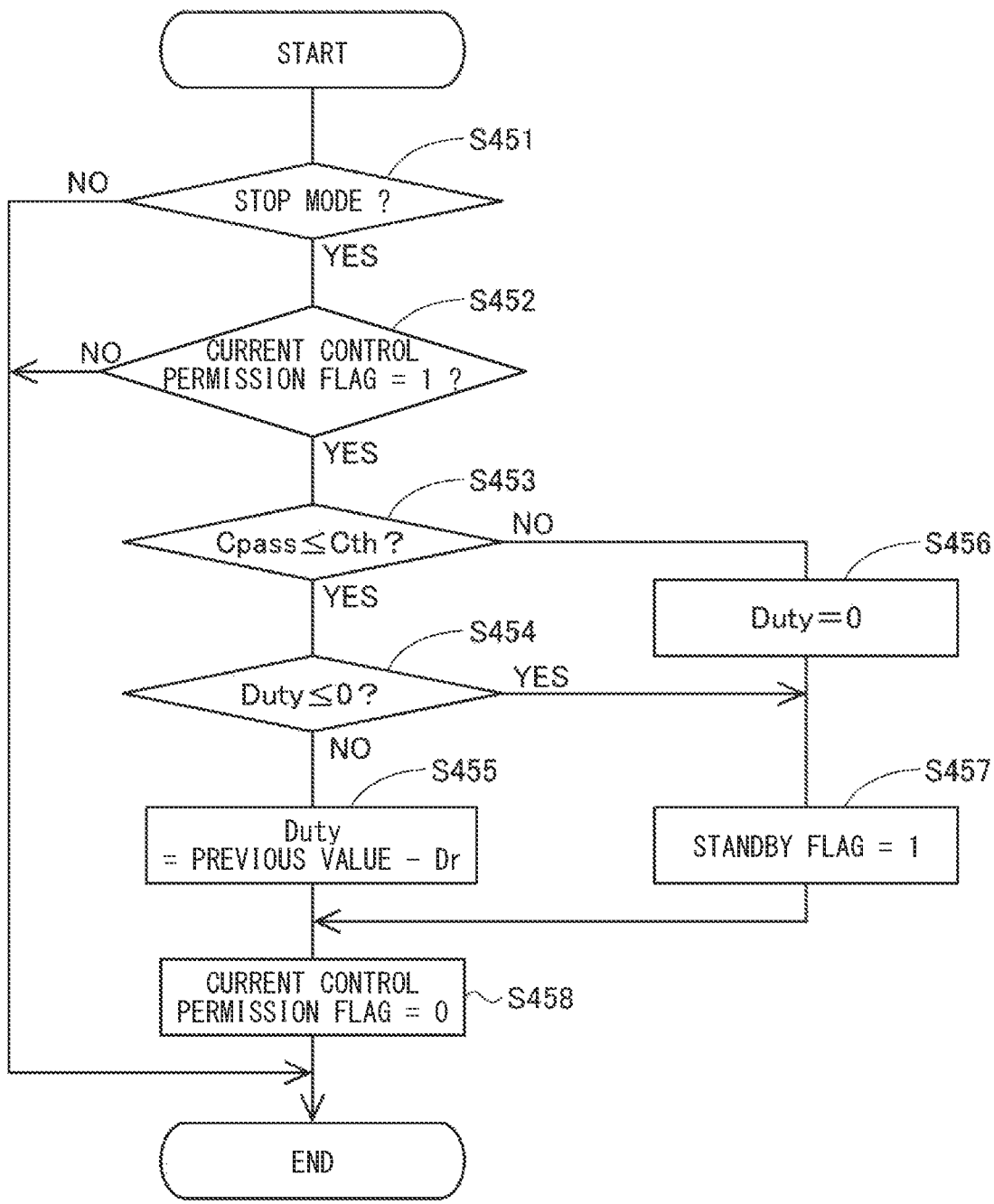
FIG. 14 is a flowchart illustrating a current control process according to a third embodiment.
Figure 15:
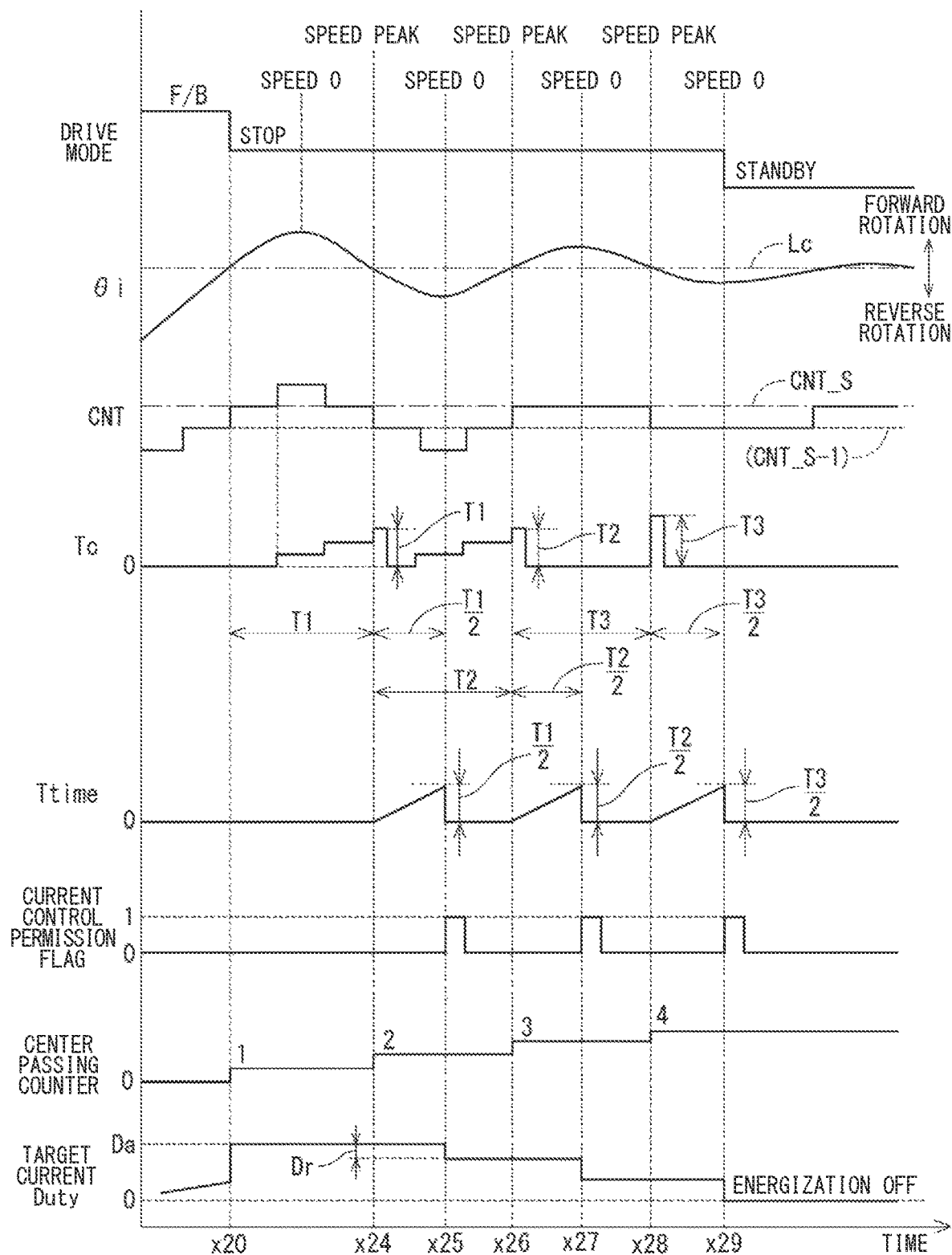
FIG. 15 is a time chart illustrating motor drive control according to the third embodiment.
Figure 16:
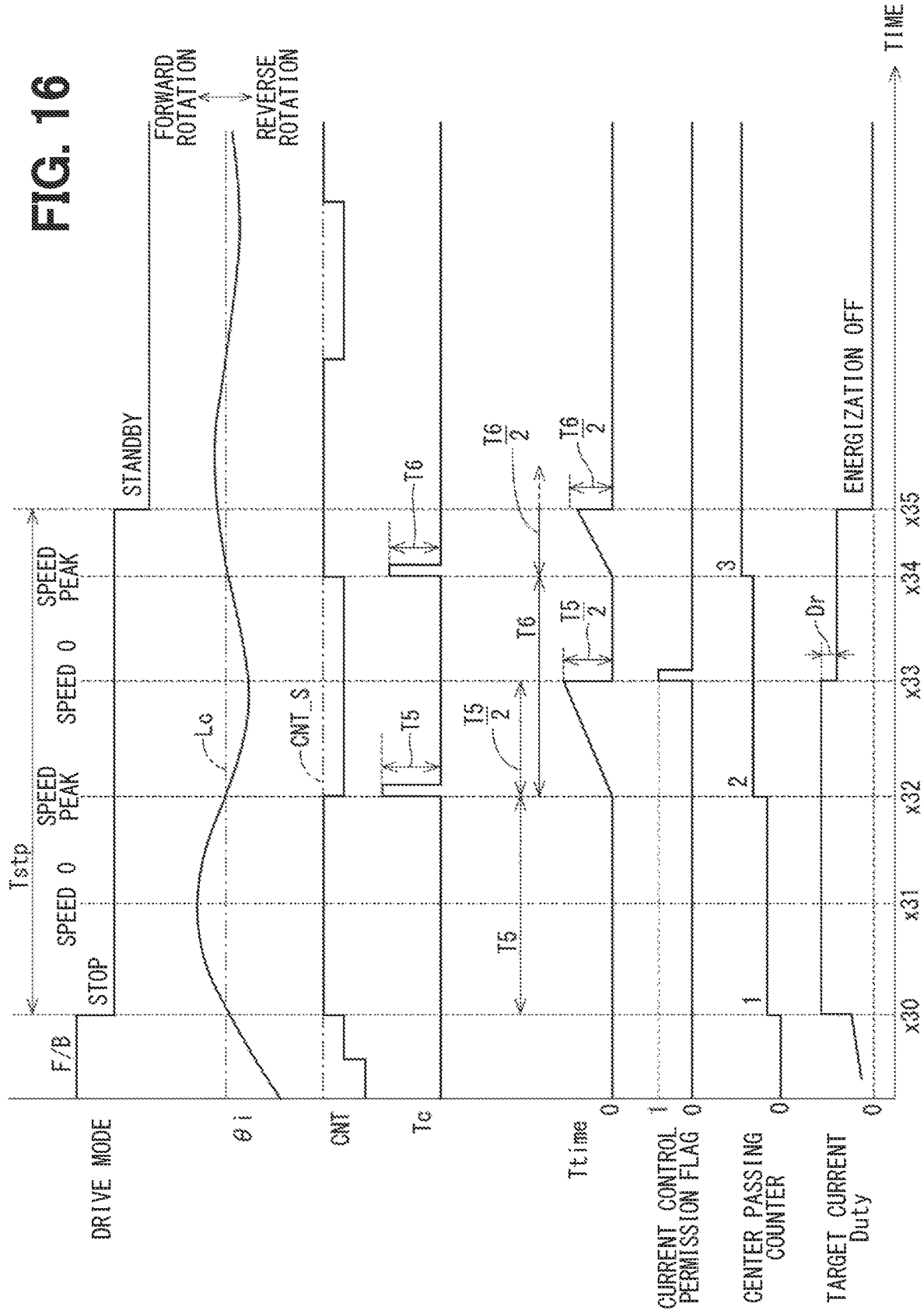
FIG. 16 is a time chart illustrating motor drive control according to the third embodiment.

A third embodiment is shown in FIGS. 14 to 16. The current control process of the present embodiment will be described with reference to the flowchart of FIG. 14. This process is executed at a predetermined cycle (for example, 1 [ms]) as in the process of FIG. 10. The processes in S451 and S452 is the same as the processes in S401 and S402 in FIG. 10.

In S453, which proceeds to the process where it is determined in S452 that the current control permission flag is set (S452: YES), the ECU 50 determines whether or not the center passing counter Cpass is the number of repetitions Cth or less. The number of repetitions Cth can be arbitrarily set, and in the present embodiment, the number of repetitions Cth is set to 3. When it is determined that the center passing counter Cpass is larger than the number of repetitions Cth (S453: NO), the process proceeds to S456. When it is determined that the center passing counter Cpass is the number of repetitions Cth or less (S453: YES), the process proceeds to S454.

In S454, the ECU 50 determines whether or not the target current duty is 0 or less. When it is determined that the target current duty is 0 or less (S454: YES), the process proceeds to S457. When it is determined that the target current duty is larger than 0 (S454: NO), the process proceeds to S455, and the target current duty is set to the value obtained by substracting the gradual decrease value Dr (for example, 10 "%") from the previous value. The gradual decrease value Dr can be arbitrarily set and may be a fixed value or may be variable according to the center passing counter Cpass or the like.

In S456, which proceeds to the process where the center passing counter Cpass is determined to be larger than the repetition number Cth (S453: NO), the target current duty is set to 0. In S457, the ECU 50 turns on the standby flag. In S458 that follows S455 or S457, the current control permission flag is turned off. Also in the above embodiment, as in the present embodiment, the current control permission flag may be reset after the standby flag is turned on.

The motor drive process of the present embodiment will be described with reference to FIGS. 15 and 16. In FIG. 15, the processes of times x20 to x25 is the same as the processes of times x10 to x15 in FIG. 11, and when the drive mode is switched to the stop mode at time x20, the center passing counter Cpass is set to 1. Further, each time the encoder edge is detected, the edge-to-edge elapsed time Tedg is added to the period estimation time Tc.

When the encoder count value CNT becomes (CNT_S−1) in a state where the rotation direction of the rotor 105 is reversed at the time x24, the period estimation time Tc corresponding to the time x20 to the time x24 is regarded as the vibration period T1 of the rotor 105, and the speed 0 point estimation time Tzero=(T1)/2 is calculated. Further, the center passing counter Cpass is incremented and the count value is set to 2.

At time x25, when the speed 0 point timing timer Timer that starts timing from time x24 becomes the speed 0 point estimation time Tzero, the current control permission flag is set, the target current duty is reduced from the fixed phase energization duty Da by the gradual decrease value Dr, and the current control permission flag is reset.

At time x24, the speed 0 point estimation time Tzero is calculated, the cycle estimation time Tc is reset, and then the edge-to-edge elapsed time Tedg is added again for each encoder edge detection. At time x25, the rotation direction of the rotor 105 changes; and the rotation direction becomes the forward rotation direction again. When the encoder count value CNT becomes CNT_S while the rotor 105 is rotating in the forward direction at time x26, it is estimated that the rotor 105 is located at the vibration center Lc. Therefore, the period estimation time Tc corresponding to the time x24 to time x26 is regarded as the vibration period T2 of the rotor 105, and the speed 0 point estimation time Tzero=(T2)/2 is calculated. Further, the center passing counter Cpass is incremented and the count value is set to 3.

At time x27, when the speed 0 point timing timer Timer that starts timing from time x26 becomes the speed 0 point estimation time Tzero, the current control permission flag is set, the target current duty is further reduced by the amount of the gradual decrease value Dr, and reset the current control permission flag.

When the rotation direction of the rotor 105 changes at time x27, the rotation direction of the rotor 105 becomes the reverse rotation direction again. At time x28, the encoder count value CNT becomes (CNT_S−1) while the rotor 105 is reversed. From time x26 to time x28, the encoder count value CNT does not change from CNT_S. At time x28, the period estimation time Tc corresponding to time x28 from time x26 is regarded as the vibration period T3 of the rotor 105, and the speed 0 point estimation time Tzero=(T3)/2 is calculated. Further, the center passing counter Cpass is incremented and the count value is set to 4.

At time x 29, when the speed 0 point timing timer Ttime that starts timing from the time x28 becomes the speed 0 point estimation time Tzero, the current control permission flag is set. In the present embodiment, the number of repetitions Cth is set to 3, and the count value of the center passing counter Cpass at time x29 is 4, which is larger than the number of repetitions Cth. Therefore, the standby flag is set to shift to the standby mode, and the energization is turned off. In the present embodiment, when the rotor 105 passes through the vibration center Lc a predetermined number of times (4 times in this example), that is, when the center passing counter Cpass exceeds the number of repetitions Cth or the target current duty becomes 0, it proceeds to the standby mode.

In the present embodiment, the vibration energy is reduced and the rotor 105 is gradually stopped by gradually reducing the current at the timing when the rotation speed of the rotor 105 is estimated to be 0. As a result, the rotor 105 can be stopped accurately even if a processing time of the computer, an assembly of the rotation angle sensor 13, and a variation in magnetism occur at the same time.

FIG. 16 shows an example in which the vibration cycle of the rotor 105 in the stop control is large and the amplitude is small. The process at the time x30 is the same as the process at the time x10 in FIG. 11. At time x31, the rotor 105 reverses and rotates in the reverse direction, and at time x32, the encoder count value CNT becomes (CNT_S−1) while the rotor 105 reverses. From time x30 to time x32, the encoder count value CNT does not change from CNT_S. The period estimation time Tc corresponding to the time x30 to the time x32 is regarded as the vibration period T5 of the rotor 105, and the speed 0 point estimation time Tzero=(T5)/2 is calculated. Further, the center passing counter Cpass is incremented and the count value is set to 2.

At time x33, when the speed 0 point timing timer Ttime that starts timing from time x32 becomes the speed 0 point estimation time Tzero, the energization control permission flag is set, the target current duty is reduced from the fixed phase energization duty Da by the gradual decrease value Dr, and the current control permission flag is reset.

When the rotation direction of the rotor 105 changes at time x33, the rotation direction of the rotor 105 becomes the forward rotation direction. At time x34, the encoder count value CNT becomes CNT_S while the rotor 105 is rotating in the forward direction. From time x32 to time x34, the encoder count value CNT does not change from (CNT_S−1). At time x34, the period estimation time Tc corresponding to time x32 to time 34 is regarded as the vibration cycle T6 of the rotor 105, and the speed 0 point estimation time Tzero=(T6)/2 is calculated. Further, the center passing counter Cpass is incremented and the count value is set to 3.

At time x35, which is a timing before the speed 0 point timing timer Ttime, which starts timing from time x34, reaches the speed 0 point estimation time Tzero, since the elapsed time Tstp from the time x30 when the stop mode is started becomes a progress determination threshold value Tstp_th, it proceeds to the standby mode, and the energization is turned off.

As described with reference to FIG. 16, depending on the vibration period and amplitude of the rotor 105, it may not be possible to estimate the speed 0 point, or it may take time to estimate it. In the present embodiment, when the elapsed time Tstp from the start of stop control exceeds the progress determination threshold value Tstp_th, the stop mode can be appropriately terminated by shifting to the standby mode regardless of the speed 0 point. The same applies to the above embodiment.

In the present embodiment, the energization control unit 55 gradually reduces the current at the speed 0 point. In the present embodiment, the current is reduced stepwise by gradually reducing the target current duty by the gradual decrease value Dr. As a result, the motor 10 can be appropriately stopped by reducing the vibration energy even when there are variations in the assembly of the shift-by-wire system 1 and variations in control.

The energization control unit 55 turns off energization at the speed 0 point when the number of times the rotor 105 has passed through the vibration center exceeds a predetermined number of times. As a result, the stop control can be appropriately terminated. Further, when the elapsed time Tstp from the start of the stop control exceeds the progress determination threshold value Tstp_th, the energization control unit 55 turns off the energization regardless of the speed 0 point. As a result, even if the rotor 105 does not vibrate, the speed 0 point cannot be estimated due to the vibration cycle or amplitude, or the estimation takes time, the stop control can be appropriately terminated.

Fourth Embodiment

Figure 17:
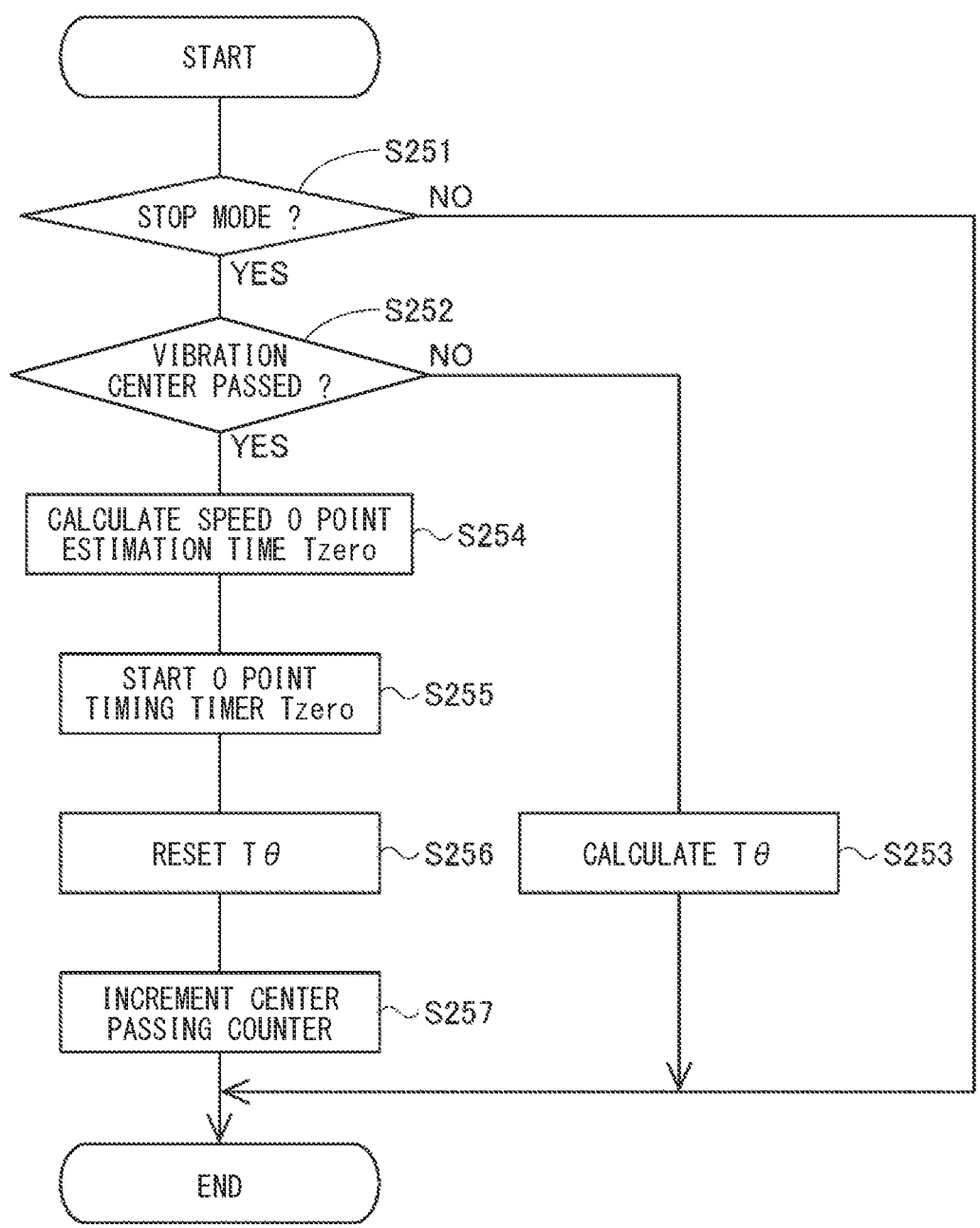
FIG. 17 is a flowchart illustrating a speed 0 point estimation process according to a fourth embodiment.

A fourth embodiment is shown in FIG. 17. In the above embodiment, the rotation angle sensor 13 is an encoder, and the speed 0 point is estimated based on the edge of the encoder signal and the encoder count value CNT based on the edge. The rotation angle sensor 13 of the present embodiment is a linear sensor that detects a rotor displacement amount θi as the motor angle, and estimates the speed 0 point based on the detection value of the linear sensor. In the present embodiment, the method of estimating the speed 0 point will be mainly described, and the description of current control and the like will be omitted. Any embodiment may be applied to the current control at a speed 0 point.

The speed 0 point estimation process of the present embodiment will be described with reference to the flowchart of FIG. 17. This process is executed at a predetermined cycle (for example, 1 [ms]). In the present embodiment, instead of storing the stop control start count CNT_S in S107 in FIG. 7, the stop control start angle θinit, which is the rotor displacement amount θi at the time of transition to the stop mode, is stored.

Figure 8:
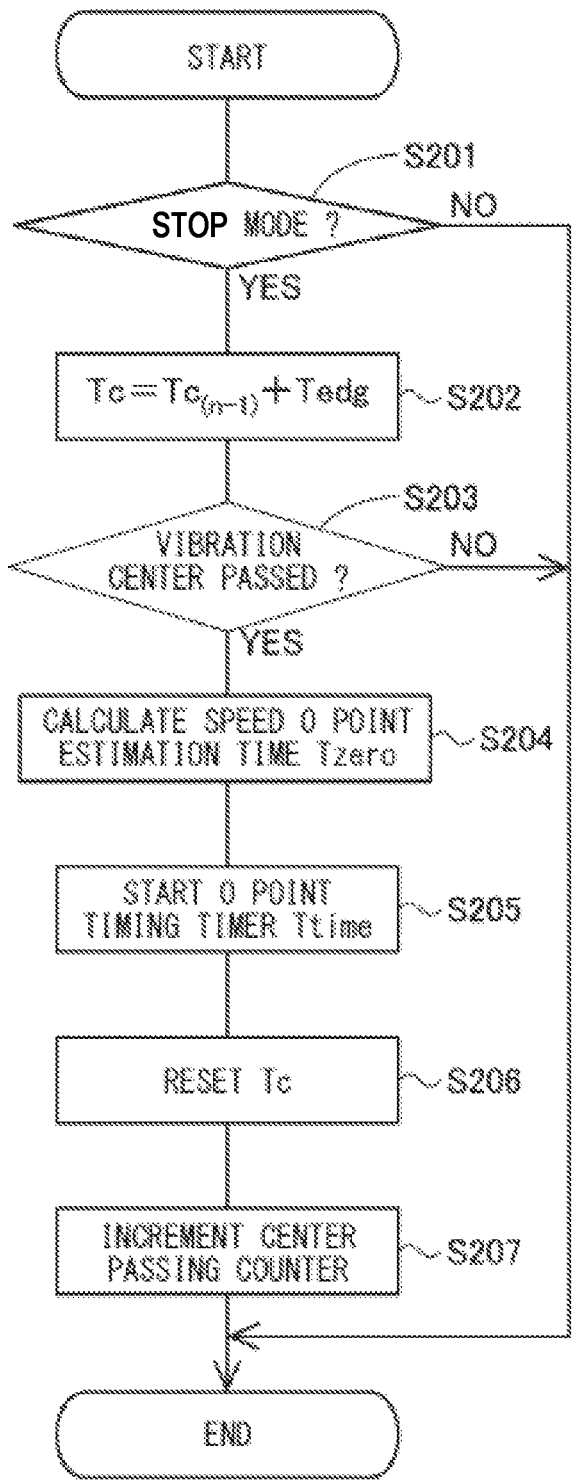
FIG. 8 is a flowchart illustrating a speed 0 point estimation process according to the first embodiment.

The process of S251 is the same as that of S201 in FIG. 8, and in S252, which proceeds to the process where the drive mode is determined to be the stop mode (S251: YES), the zero point estimation unit 56 determines whether or not the rotor 105 has passed through the vibration center Lc. In the present embodiment, it is determined whether or not the rotor has passed through the vibration center Lc based on the rotor displacement amount θi and the stop control start angle θinit. When it is determined that the rotor 105 has not passed through the vibration center Lc (S252: NO), the process proceeds to S253 and the period estimation time Tθ is calculated. Specifically, a value corresponding to the calculation cycle is added to the previous value of the cycle estimation time Tθ. When it is determined that the rotor 105 has passed through the vibration center Lc (S252: YES), the process proceeds to S254 and the speed 0 point estimation time Tzero is calculated (see equation (6)).

$$Tzero=T\theta/2 \quad (6)$$

The process of S255 is the same as that of S205 in FIG. 8, and the zero point estimation unit 56 starts the speed 0 point timing timer Ttime. The zero point estimation unit 56 resets the period estimation time Tθ in S256 and increments the center passing counter Cpass in S257.

As described above, even if the linear sensor is used instead of the encoder as the rotation angle sensor 13, the speed 0 point can be appropriately estimated. In addition, the same effects as those of the above embodiment can be obtained.

Other Embodiments

In the above embodiment, after driving the motor by feedback control, the stop control is performed. In another embodiment, the motor control method before starting the stop control is not limited to the feedback control, and may be applied to any control method. Further, in another embodiment, the current control other than the above described embodiment may be switched to at the speed 0 point.

In the above embodiment, the motor rotation angle sensor that detects the rotation angle of the motor is the three-phase encoder or the linear sensor. In another embodiment, the motor rotation angle sensor may be a two-phase encoder, or any other motor rotation angle sensor may be used as long as it can detect the rotation position of the rotor. In the present embodiment, the potentiometer was illustrated as an output shaft sensor. In another embodiment, the output shaft sensor may be any sensor. Further, the output shaft sensor may be omitted.

According to the embodiments described above, the motor is a permanent magnet type three phase brushless motor. In another embodiment, any motor may be used, such as a switched reluctance (SR) motor. According to the embodiments described above, the four recess portions are formed in the detent plate. According to another embodiment, the number of the recess portions is not limited to four and may be another number. For example, a configuration may be employable where the number of the recess portions of the detent plate is two and where the P range and the not P range are switchable therebetween. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A shift range control device that switches a shift range by controlling a drive of a motor in which a rotor rotates by energizing a motor winding, the shift range control device comprising:

an angle calculation unit configured to calculate a motor angle based on a signal from a rotation angle sensor that detects a rotation position of the rotor;

an energization control unit configured to drive the rotor so that the motor angle becomes a target angle according to a target shift range, and configured to stop the rotor at a position where the motor angle becomes the target angle, by controlling energization of the motor winding; and a zero point estimation unit configured to estimate a speed 0 point, which is a timing at which a rotational speed of a vibrating rotor becomes 0 during a stop control for stopping the rotor, wherein the energization control unit switches current control at an estimated speed 0 point; and the zero point estimation unit estimates the speed 0 point based on a vibration cycle of the rotor specified by using a detection value of the rotation angle sensor.

2. The shift range control device according to claim 1, wherein the rotation angle sensor is an encoder having a detection element, and the detection element is provided at a position where a signal edge is generated at a position that becomes a vibration center of the rotor in the stop control.

3. The shift range control device according to claim 2, wherein the energization control unit gradually reduces current at the speed 0 point.

4. The shift range control device according to claim 3, wherein the energization control unit turns off energization at the speed 0 point, when number of times the rotor has passed through a vibration center exceeds a predetermined number of times.

5. The shift range control device according to claim 2, wherein the energization control unit turns off energization at the speed 0 point.

6. The shift range control device according to claim 1, wherein the energization control unit gradually changes current from the speed 0 point.

7. The shift range control device according to claim 1, wherein the energization control unit turns off the energization regardless of the speed 0 point, when an elapsed time from start of the stop control exceeds a progress determination threshold value.

8. The shift range control device according to claim 1, wherein:

the zero point estimation unit is configured to determine whether or not the rotor has passed through a vibration center.

9. A shift range control device that switches a shift range by controlling a drive of a motor in which a rotor rotates by energizing a motor winding, the shift range control device comprising:

a computer including a processor and a memory that stores instructions configured to, when executed by the processor, cause the processor to calculate a motor angle based on a signal from a rotation angle sensor that detects a rotation position of the rotor;

drive the rotor so that the motor angle becomes a target angle according to a target shift range, and configured to stop the rotor at a position where the motor angle becomes the target angle, by controlling energization of the motor winding;

estimate a speed 0 point, which is a timing at which a rotational speed of a vibrating rotor becomes 0 during a stop control for stopping the rotor; and switch current control at an estimated speed 0 point;

wherein the computer causes the processor to estimate the speed 0 point based on a vibration cycle of the rotor specified by using a detection value of the rotation angle sensor.

10. The shift range control device according to claim 9, wherein the rotation angle sensor is an encoder having a detection element, and the detection element is provided at a position where a signal edge is generated at a position that becomes a vibration center of the rotor in the stop control.

11. The shift range control device according to claim 9, wherein the computer causes the processor to gradually reduce current at the speed 0 point.

12. The shift range control device according to claim 11, wherein the computer causes the processor to turn off energization at the speed 0 point, when number of times the rotor has passed through a vibration center exceeds a predetermined number of times.

13. The shift range control device according to claim 9, wherein the computer causes the processor to turn off energization at the speed 0 point.

14. The shift range control device according to claim 9, wherein the computer causes the processor to gradually change current from the speed 0 point.

15. The shift range control device according to claim 9, wherein the computer causes the processor to turn off the energization regardless of the speed 0 point, when an elapsed time from start of the stop control exceeds a progress determination threshold value.

16. The shift range control device according to claim 9, wherein the computer causes the processor to determine whether or not the rotor has passed through a vibration center.

* * * * *